US006628598B2

(12) United States Patent
Edwards et al.

(10) Patent No.: US 6,628,598 B2
(45) Date of Patent: Sep. 30, 2003

(54) PATTERNED MEDIA SYSTEM

(75) Inventors: Jathan D. Edwards, Afton, MN (US); Garry R. Lundstrom, Forest Lake, MN (US); Paul R. Iverson, St. Croix Falls, WI (US); Joseph H. Sexton, Oakdale, MN (US)

(73) Assignee: Imation Corp., Oakdale, MN (US)

( * ) Notice: Subject to any disclaimer, the term of this patent is extended or adjusted under 35 U.S.C. 154(b) by 399 days.

(21) Appl. No.: 09/730,242

(22) Filed: Dec. 5, 2000

(65) Prior Publication Data
US 2002/0067680 A1 Jun. 6, 2002

(51) Int. Cl.[7] .................................................. G11B 7/00
(52) U.S. Cl. ...................... 369/99; 369/124; 369/14; 360/59; 360/77.03
(58) Field of Search ...................... 369/126, 14, 99; 360/59, 77.03

(56) References Cited

U.S. PATENT DOCUMENTS

| 4,303,806 A | | 12/1981 | Thiele |
| 4,304,806 A | | 12/1981 | Anderson et al. |
| 4,374,077 A | | 2/1983 | Kerfeld |
| 4,519,065 A | | 5/1985 | Lewis et al. |
| 4,719,615 A | | 1/1988 | Feyrer et al. |
| 5,535,190 A | | 7/1996 | Moore et al. |
| 5,576,918 A | | 11/1996 | Bar-Gadda et al. |
| 5,626,941 A | | 5/1997 | Ouano |
| 5,723,033 A | | 3/1998 | Weiss |
| 5,739,972 A | * | 4/1998 | Smith et al. ............. 360/77.03 |
| 5,751,510 A | | 5/1998 | Smith et al. |
| 5,872,676 A | | 2/1999 | Smith et al. |
| 6,052,249 A | * | 4/2000 | Abraham et al. ............. 360/59 |
| 6,088,176 A | | 7/2000 | Smith et al. |
| 6,344,949 B1 | * | 2/2002 | Albrecht et al. ............. 360/230 |
| 6,417,981 B1 | * | 7/2002 | Smith .......................... 360/75 |

FOREIGN PATENT DOCUMENTS

WO          WO 00/48172          8/2000

* cited by examiner

Primary Examiner—Nabil Hindi
(74) Attorney, Agent, or Firm—Eric D. Levinson

(57) ABSTRACT

A system for reading data from recording media having topographical features readable with a slider-mounted non-magnetic transducer sensitive primarily to changes in local aerodynamic boundary conditions.

27 Claims, 8 Drawing Sheets

PATTERNED MEDIA SYSTEM

FIELD OF THE INVENTION

This invention concerns systems having media that have topographical features detectable by slider-mounted transducers sensitive primarily to a change in local aerodynamic boundary conditions.

BACKGROUND OF THE INVENTION

To meet the insatiable demand for inexpensive and inexhaustible data storage, the long and steady march of progress in the field of data recording and electronic playback has relied on many technical approaches. No approach has outperformed the versatility and extremely high storage densities of magnetic recording, in which a signal is recorded by selectively varying the magnetic moments of physical regions of media such as flexible tapes or rigid (typically rotating) disks. Another broad class of approaches relies on variations in the physical shape of the surface of the media. Such features are not detected directly, but rather are used to cause corresponding variations in characteristics such as reflectivity, coercivity, and the like that may be detected accordingly (e.g., an optical detection system, in the case of variations in reflectivity).

SUMMARY OF THE INVENTION

One aspect of the invention is a data recording medium. The medium has machine readable topographical features and a hard coat layer (or stack) substantially conforming to the topographical features. The features affect a change in local aerodynamic boundary conditions between the recording medium and a slider-mounted non-magnetic transducer passing over the medium, which may be detectable by the transducer to playback the data encoded in the topographical features. The topographical features may be above or below the adjacent surface. The detectable change in local aerodynamic boundary conditions may affect temperature or pressure.

BRIEF DESCRIPTION OF THE DRAWINGS

The accompanying drawings show a particular embodiment of the invention as an example, and are not intended to limit the scope of the invention.

DETAILED DESCRIPTION

In general terms, the invention includes a system capable of playing back machine readable data represented in patterned features in a recording medium. The playback technique relies on the topography of the features and not on the composition (or other composition-dependent properties) of the material from which the features are formed. The system includes a slider-mounted non-magnetic playback transducer that responds to the changes in the local aerodynamic boundary conditions between the transducer and the medium as affected by the relative motion of the slider and the topographical features. Local aerodynamic boundary conditions are defined by the relative surfaces of the slider, the transducer, and the recording medium. The desired detectable effects are not electrical, magnetic, optical or otherwise used in known data recording systems. The electrical output of the transducer is connected in any convenient manner to appropriate circuitry that can process the transducer signal as required. The exact nature of these connections and circuitry are not critical to the scope of the invention.

Figure 1:
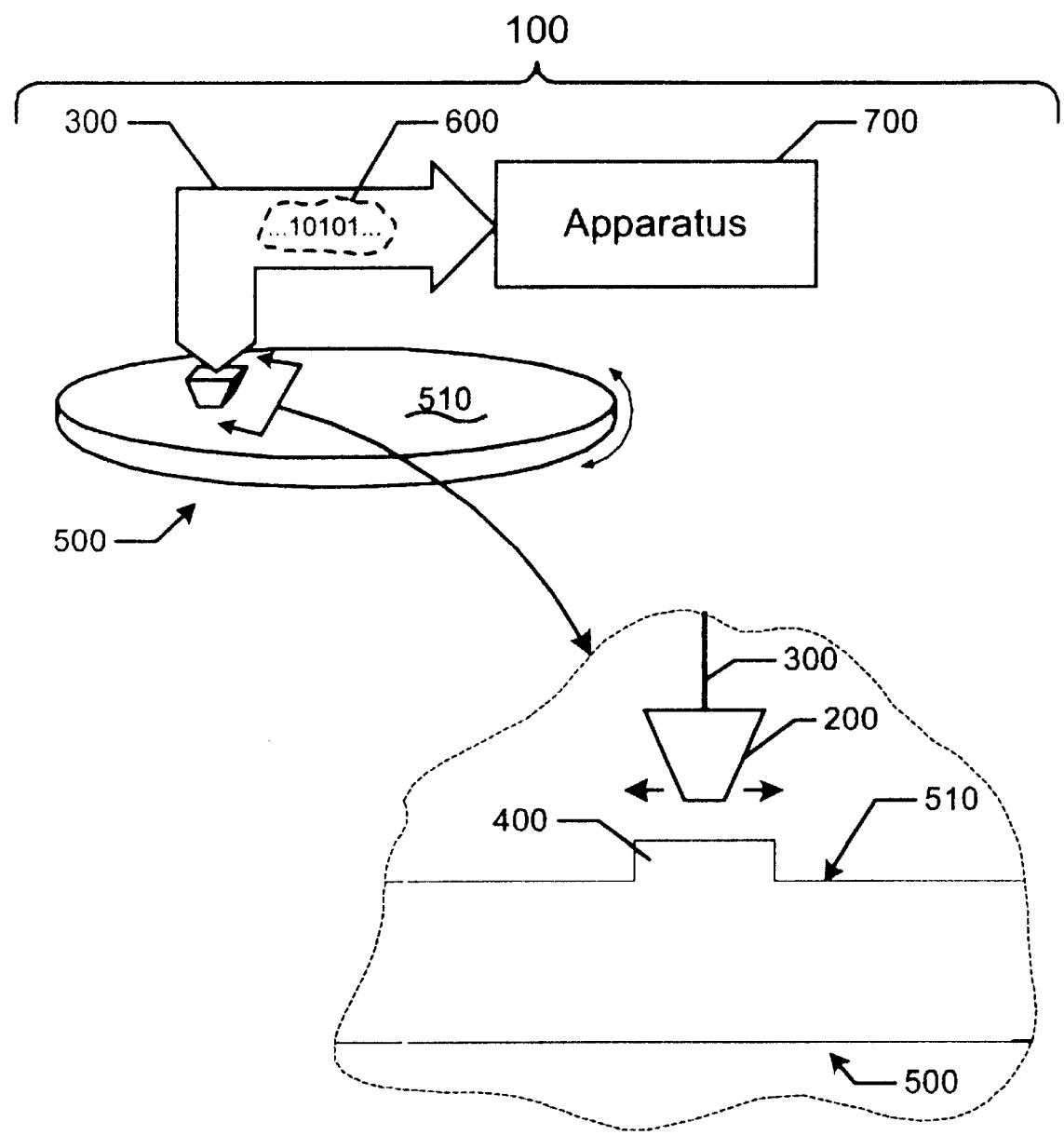
FIG. 1 is a schematic view of a patterned media system.

FIG. 1 is a general schematic diagram of a patterned media system 100. The invention includes a non-magnetic playback transducer 200 that creates a signal 300 that is representative of the presence or absence of topographical features 400 that are distinguishable from the adjacent surface 510 of a recording medium 500. (In this and all embodiments of the invention, recording medium 500 may be removable from the remainder of the system, in accordance with known principles that do not limit the scope of the invention in any manner.) The scope of the invention includes both topographical features 400 which extend above the surface of recording medium 500 (including but not limited to "bumps") and those that extend below the surface of recording medium 500 (including but not limited to "depressions" or "pits").

Figure 9:
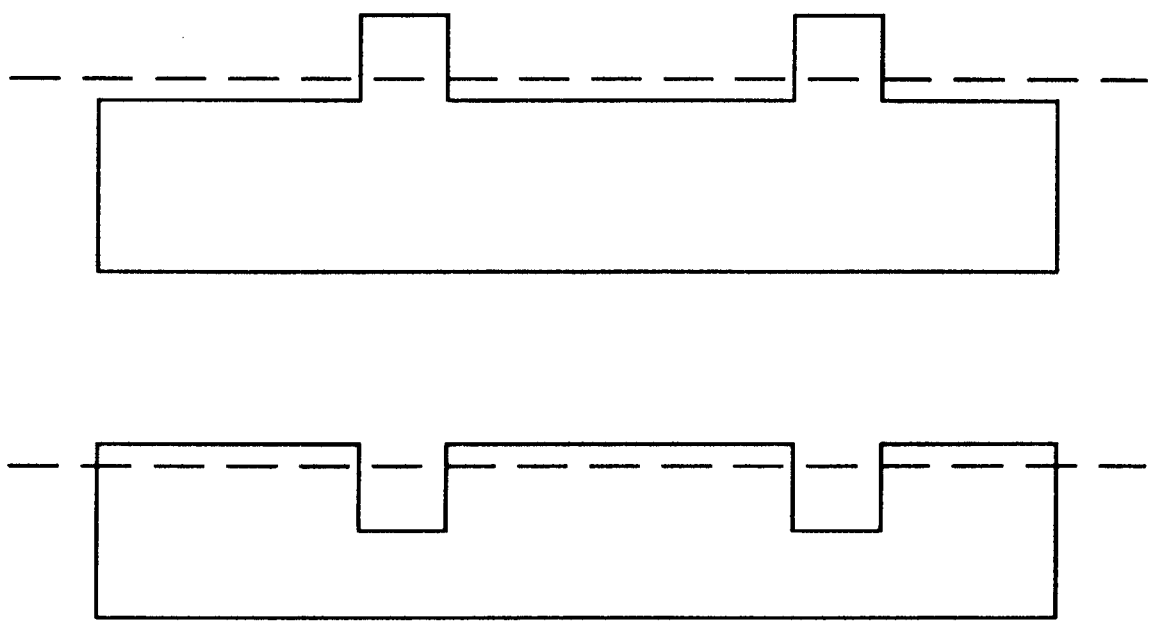
FIG. 9 is a schematic view of a patterned medium.

With respect to topographical features, "above" and "below" a substrate surface may be understood with respect to an average thickness of a substrate along with the relative breadth of the features vis-à-vis the regions between the features, all as illustrated in FIG. 9. Some features have average breadth less than the average distance between themselves; and if the average thickness (dashed line) lies above the region between such features, as in the upper portion of the Figure, then any topographic feature lying above that plane is understood to be a "bump" (or similar term) above the surface of the substrate. Conversely, if the average thickness (dashed line) lies below the region between such features, as in the lower portion of the Figure, then any topographic feature lying below that plane is understood to be a "pit" (or similar term) below the surface of the substrate.

In a typical embodiment of the invention, recording medium 500 ranges from 0.3 to 2.0 millimeter in thickness (neglecting topographical features 400). Topographical features 400 generally extend between 5 and 50 nanometers in height above the surface of recording medium 500, although heights up to 100 nanometer are possible. When topographical features 400 extend below the surface of recording medium 500, they generally do so to a depth of 20 to 150 nanometer.

The shape of topographical features 400, both in cross-section and as viewed from above recording medium 500, is arbitrary. When viewed from above, topographical features 400 generally have an area of less than 50,000 square nanometer. The storage capacity of the recording medium 500 is related to the size and separation of individual topographical features 400 and the size of the recording medium. For example, a series of topographical features 400 having a center-to-enter separation of 0.2 micron along the direction of playback (the so-called "bit pitch" in the "down-track" dimension), and center—center separations of 0.4 micron in the radial direction between such series (the so-called "track pitch"), would yield approximately 15 gigabytes of data on a 120 millimeter diameter disk.

Regardless of the shape of the physical features or how they are formed, the data 600 has been represented as variations in the topographical features 400 on the recording medium 500. (Typically the variations represent digital data, i.e., presence of a variation is "on" and absence of a variation is "off" or vice versa.) Transducer 200 senses topographical features 400 and produces a signal 300 that represents the data 600 recorded on the medium 500. The transducer 200 is connected in any convenient manner (usually an electrical or electronic connection) to appropriate apparatus (typically electronic circuitry) 700 that can process the transducer signal 300 as required.

As the slider-mounted transducer flies over the recording medium, the topography of the recording medium creates detectable effects due to changes of the local aerodynamic boundary conditions defined by the transducer and the medium. The transducer thus produces a signal representative of such effects, and therefore data may be encoded into the recording medium for playback by the transducer by intentionally arranging such features of the recording medium to represent the data into a so-called "machine readable" form.

Detectable effects due to changes in local aerodynamic boundary conditions include (but are not limited to) temperature variations and pressure variations. Either a pressure sensitive transducer or a temperature sensitive transducer can therefore be used.

One advantage of the invention is that the data signal is determined by the topography of the medium and not the chemical composition, electromagnetic interaction, or optical properties of the active recording layer.

Another advantage of the invention is that the data signal is not generated by effects ultimately caused by contact between the transducer and the medium, such as the vibrations of a phonograph needle that are caused by continuous contact between the needle and the sides of a groove on a phonograph record. Similarly, the data signal is not generated by deflections of the transducer as it interacts with the topographical features. This is in contrast to techniques such as atomic force microscopy (AFM) recording, which measures deflections of (or forces acting on) a stylus due to contact. Nor does the invention rely on the piezoelectric effect. Nor does the invention rely in any manner on deflection or deformation of the topographical features of the media.

Figure 2:
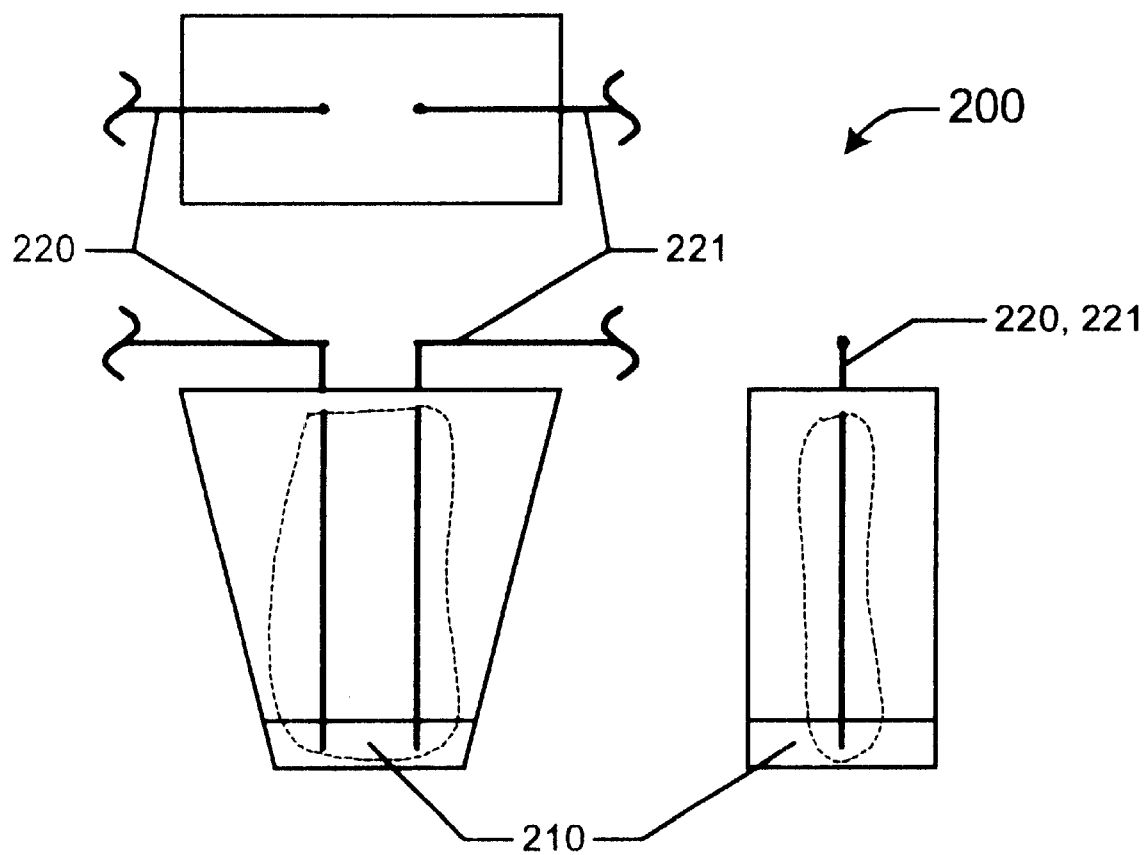
FIG. 2 is a schematic view of a transducer suitable for use with the system of FIG. 1.

FIG. 2 is a schematic view of transducer 200. Transducer 200 comprises a sensor sensitive to changes in local aerodynamic boundary conditions 210 that provides a signal (typically an electrical signal) indicative of the changes in local aerodynamic boundary conditions caused by the features of the recording medium. One broad class of sensor sensitive to changes in local aerodynamic boundary conditions 210 included in the scope of this embodiment is a pressure sensor, and another broad class of sensor sensitive to changes in local aerodynamic boundary conditions 210 included in the scope of this embodiment is a temperature sensor.

One embodiment of transducer 200 comprises a sensor 210 in the form of a temperature sensitive resistor (TSR), i.e., an element that varies in electrical resistivity as a function of its temperature. One broad class of TSR included in the scope of this embodiment is known as a thermistor, and another broad class of TSR included in the scope of this embodiment is known as a resistance temperature detector (RTD). Thermistors and RTDs utilize the temperature dependence of resistivity of semiconductors and metals, respectively.

In either case, a bias current is placed through the device on leads 220 and 221. The change in electrical potential (voltage) through the TSR due to the resistivity of the material is measured by connecting leads 220, 221 to appropriate circuitry 700 (see FIG. 1). All other factors being equal (or appropriately taken into account), the measured resistivity reflects the temperature experienced by the TSR, which is affected by the variations in features 400 of patterned data recording medium 500 (see FIG. 1).

The specific design of transducer 200 is not critical to the scope of this invention. Additional details of suitable yet optional embodiments of transducer 200 may be found in U.S. patent application Ser. No. 09/730,103, entitled "Temperature Sensitive Patterned Media Transducers."

Figure 3:
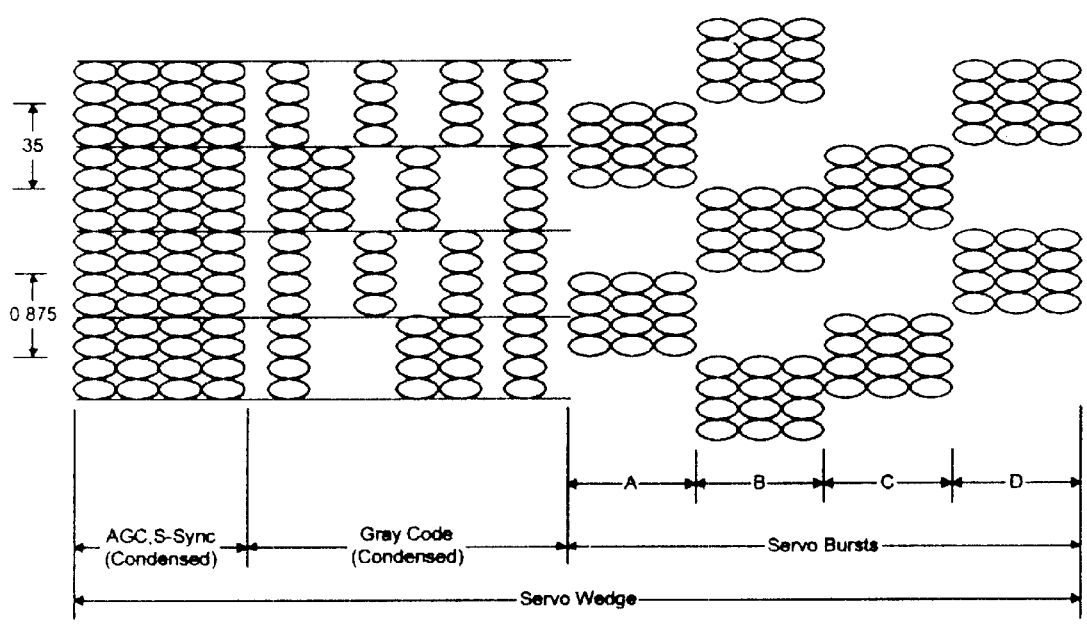
FIG. 3 is a schematic view of a data format.

The data recorded in the topographical features according to this invention may be so-called "hard" format or servopositioning data that is created as part of the process of manufacturing the entire recording media product, and therefore the end user of the data recording medium cannot change it. For example, FIG. 3 is a schematic illustration of a data format, specifically a non-volatile servo format. Each ellipse represents a bump on, or a pit in, the recording medium. The format assumes that a transducer travels from left to right with respect to the frame of reference of the Figure (i.e., the transducer and substrate could both be moving relative to each other). Thus, it is the down-track dimension of the feature (i.e., the major axis of the ellipse) that determines the signal sensed by the transducer as it passes over feature after feature along the track direction. This dimension could be on the order of 218 nanometer, but this is only an example for purposes of illustration.

In the example of FIG. 3, four rows of features as taken in the radial direction represent one servo track width; as illustrated, the track pitch is approximately 0.875 micrometer (35 microinch), which produces approximately 11,400 tracks per centimeter (approximately 28,600 tracks per inch). The number of rows of features is not critical to the scope of the invention. Thus, by using eight rows of features, the track pitch could be doubled (track density halved), and by using only two rows of features, the track pitch could be halved (track density doubled). It is assumed for purposes of illustration, but not a requirement of the invention, that the width of the transducer is the same as the width of a single track.

As indicated in FIG. 3, a region of data ("servo wedge") comprises several subregions, the data in each of which being dedicated to a specific purpose. In one subregion, the data represents signals such as automatic gain control (AGC), conventional S-Sync and the like; in another subregion, condensed Gray Code data; in a third subregion, servo burst signals. The type of signal represented by the data is not critical to the scope of the invention, nor is the number or arrangement of types of data signals.

The feature may be any shape in cross section, and not just the oval shape shown for purposes of illustration. It may be detected using either edge detection or peak detection techniques, depending on the type of transducer and/or signal processing circuitry employed. For example, one possible type of transducer responds to the temperature effects related to air compression as the transducer surface encounters a leading or trailing edge of a feature. Thus, an edge detection method similar to the tangential push-pull detection method used in the commercially available Digital Versatile Disk (DVD) format may be employed. One specific type of thermal sensing transducer is a magnetoresistive or giant-magnetoresistive transducer which is used to detect change in resistance as a function of change in temperature, as opposed to its conventional use to detect change in resistance as a function of change in magnetization. The direct current (DC) transducer output may be differentiated to produce a signal having similar recording densities as the DVD format, assuming the feature dimensions are the same, i.e., at least 400 nanometer in dimension as required by the known DVD specification. As noted above, the scope of the invention is not limited to these feature dimensions and/or recording densities.

In general, peak detection schemes produce only half the data density of edge detection schemes, because a single feature has two edges (leading and trailing) but only one peak or plateau. However, peak detection schemes are easier to implement in circuitry and/or software. Thus, features slightly less than 200 nanometer (to provide some margin for error in the detection scheme) could generate recording densities similar to the DVD format if a peak detection scheme were employed, or twice the DVD format if the more complicated edge detection schemes were employed. Even smaller features could be resolved if some type of error correction scheme were added to account for the increased difficulty of accurately resolving smaller features. For example, the Partial-Response, Maximum-Likelihood (PRML) techniques commonly used in magnetic hard disk drives are suitable for use with the invention, taking into account whatever minor changes would be desired by one skilled in the art once informed of this invention.

EXAMPLE

A polycarbonate substrate was molded from a glass master using a 16 nanometer layer of photoresist to produce a pattern of features, each 16 nanometer in height. The substrate was otherwise typical of and suitable for use as, a substrate for a data recording medium. A layer of magnetic material was not present on the substrate. The substrate was tested with a conventional flying giant magnetoresistive (GMR) transducer at a fly height of 25 nanometer, located at a radius of 36 millimeter above the substrate, which was rotated at 4000 revolutions per minute. A bias current of 2 milliampere was applied to the GMR transducer. The patterned feature produced a signal of approximately 700 millivolt, well above background noise levels. A similar experiment considered signals detected from similarly sized pits in a substrate, and concluded that bumps were more readable than pits.

Figure 4:
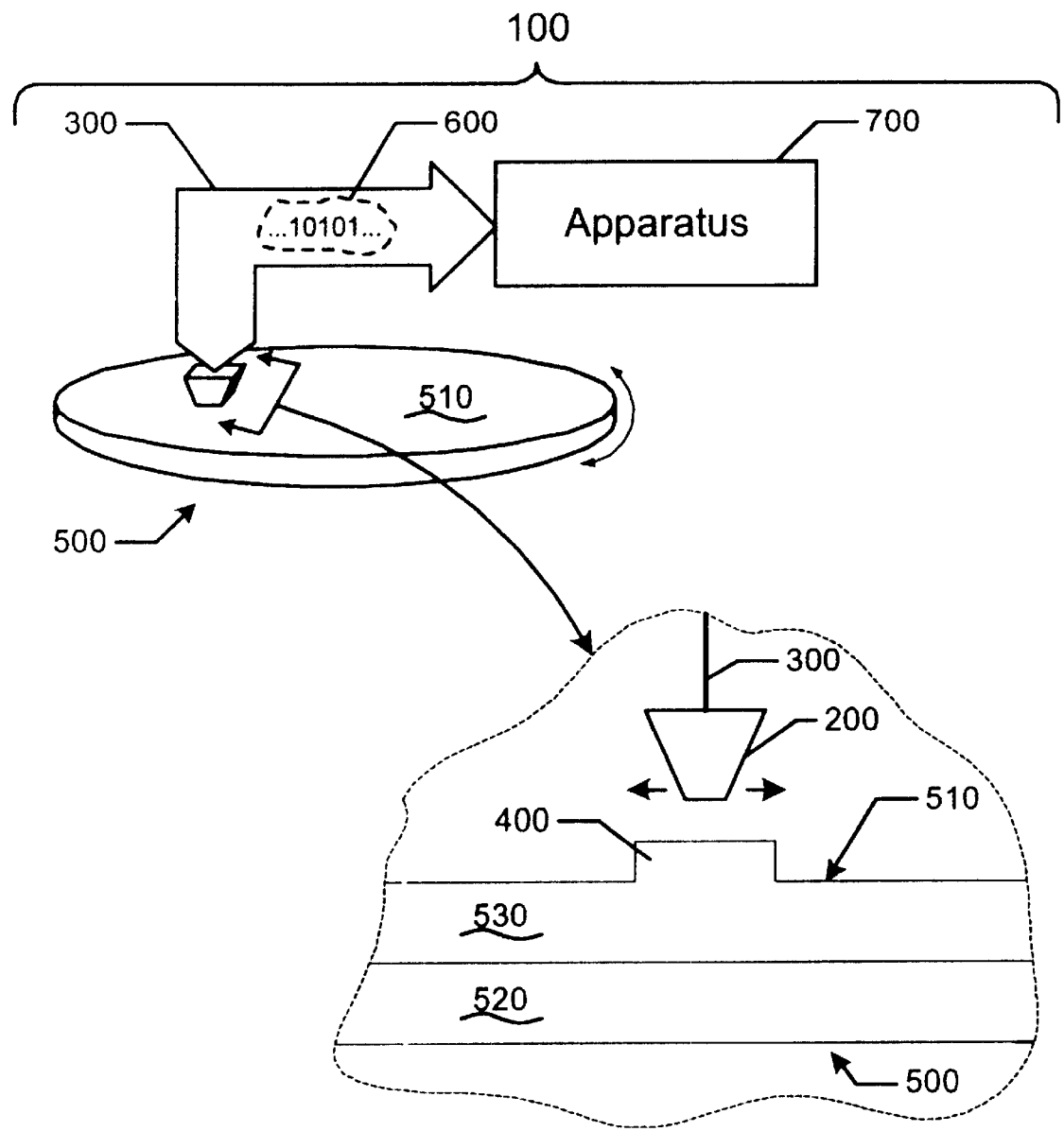
FIG. 4 is a schematic view of another embodiment of the system of FIG. 1.

Although the data playback process just described does not involve any electromagnetic or optical recording principles at all, as shown in FIG. 4, one possible embodiment of the invention is adapted for additional magnetic data recording and playback techniques, using conventional magnetic coating 530 residing on substrate 520 and an appropriate magnetic transducer (not shown in FIG. 4 for clarity). The magnetic transducer senses magnetization patterns in magnetic coating 530 and produces a signal that represents the data magnetically recorded in it. The magnetic transducer is connected in any convenient manner (usually an electrical or electronic connection) to appropriate circuitry that can process the transducer signal as required.

Figure 5:
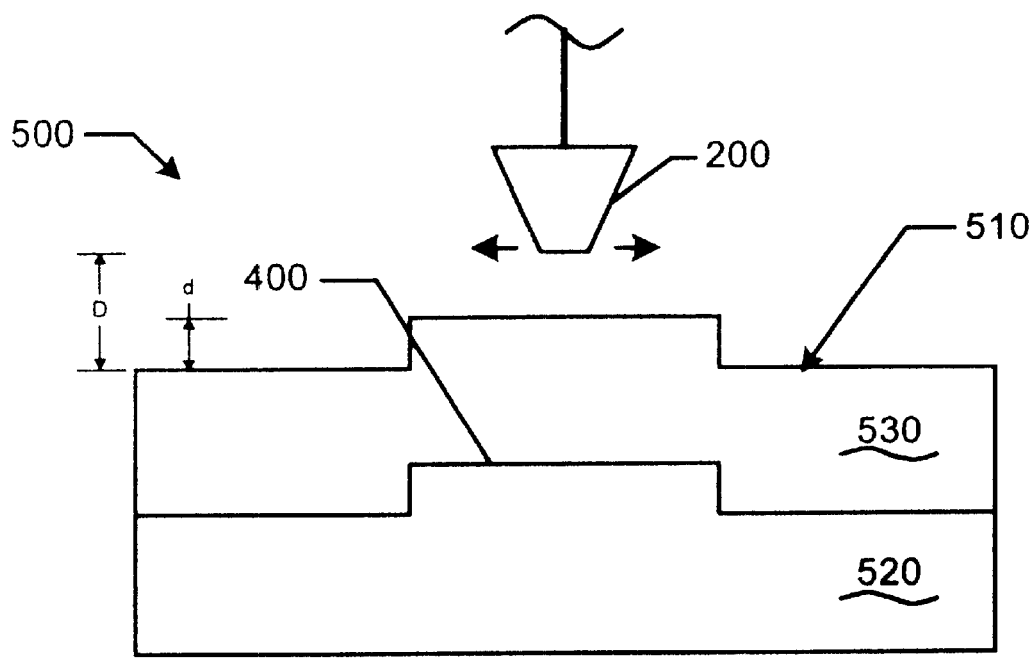
FIGS. 5–8 are schematic views of embodiments of recording media each suitable for use with the invention.

FIG. 5 is a schematic cross section of medium 500. Feature 400 extends above the surface of substrate 520 by an amount, d, that is significantly less than the average distance, or "fly height," D, of transducer 200 above surface 510 of medium 500. In the embodiment illustrated, topographical features 400 are formed integrally to substrate 520, but this is not a requirement of the invention.

Maintaining d less than D ensures that transducer 200 will not be affected with respect to its magnetic interaction with magnetic material 530. Thus, a suitable (but not required) value for D is the range of 25–75 nanometer (1–3 microinch), and a suitable (but not required) range of d is 1–25 nanometer, even about 15 nanometer (for example). This can be contrasted to conventional magnetic hard disk drives, in which typical fly heights are 25 nanometer or less.

Figure 6:
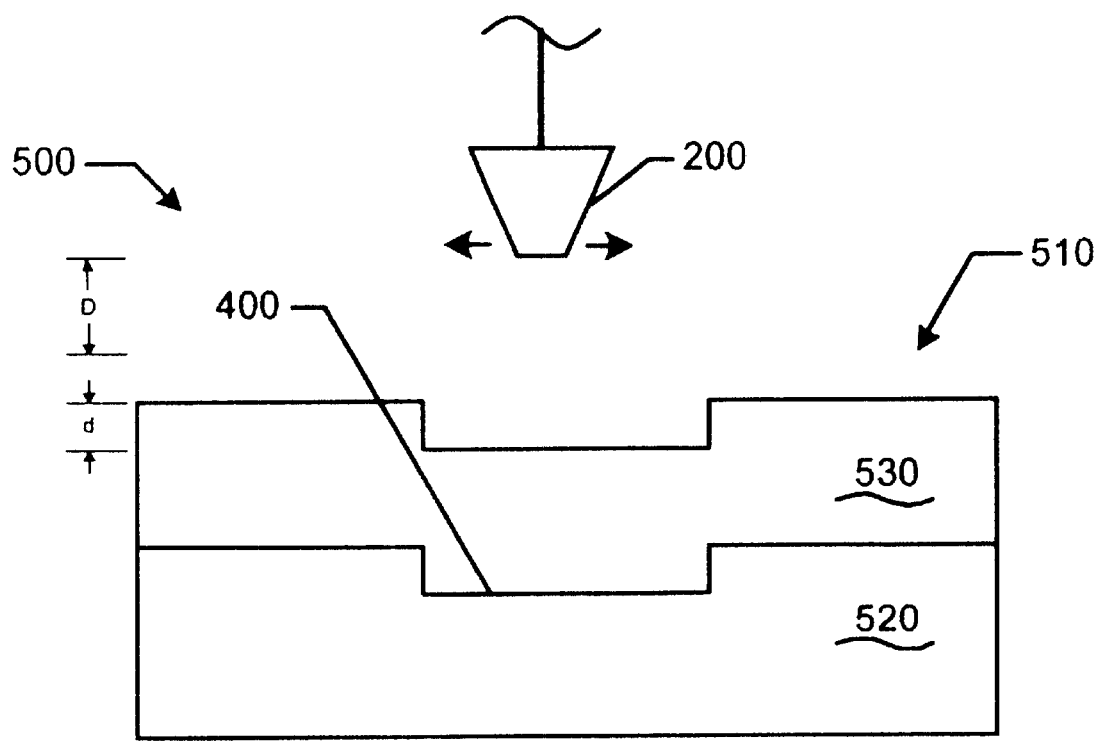

FIG. 6 is similar to FIG. 5 but illustrates a topographical feature 400 in the form of depression or pit in surface 510. Once again, in the embodiment illustrated, topographical features 400 are formed integrally to substrate 520, but again this is not a requirement of the invention. However, in this case, feature 400 should be sufficiently deep for there to be a corresponding feature in surface 510. That is, the process of coating, depositing, or otherwise placing magnetic material 530 on substrate 520 cannot fill in feature 400 so much that it cannot be detected by transducer 200.

All embodiments of the invention provide several benefits. One such benefit derives from the lack of head spacing loss described above. For a given storage density, as compared to conventional magnetic recording, the invention tolerates relatively thick hard coat layers (or stacks of thinner layers) applied above the topographical features of the recording medium. Such thick hard coat layers (or stacks) help make the system more resistant to data loss in the event of collisions between the transducer and the medium, which can happen for a variety of reasons, including vibration of the medium. This in turn permits use of alternative materials; for example, relatively low cost injection-molded plastic substrates are not generally preferred in high-density recording with flying transducers because they are less rigid than other substrates (notably glass, aluminum, or aluminum-magnesium alloys) and therefore prone to various types of vibration and high axial displacement during shock-type events. Such substrates are quite suitable for embodiments of the invention, and the topographical features may be created in such substrates by conventional embossing techniques (although the invention is not limited in this regard). As long as the surface of the hard coat layer (or stack) substantially conforms to the topography of the topographical features, as described above, the transducer may still read the data encoded in the pattern of topographical features despite its relatively greater distance from the features themselves.

Another advantage is that vulnerable thin films, such as magnetic layers, are not being used to store data, which in turn reduces the need for sophisticated approaches associated with reducing or preventing transducer crash and debris that can cause it (or otherwise interfere with the data playback process). Yet another advantage is that embodiments of the invention employing removable media may use low cost cartridges for such media, because the primary function of the cartridge need only be elimination of contact with the medium surface during transport and storage (i.e., like the conventional floppy diskette).

Figure 7:
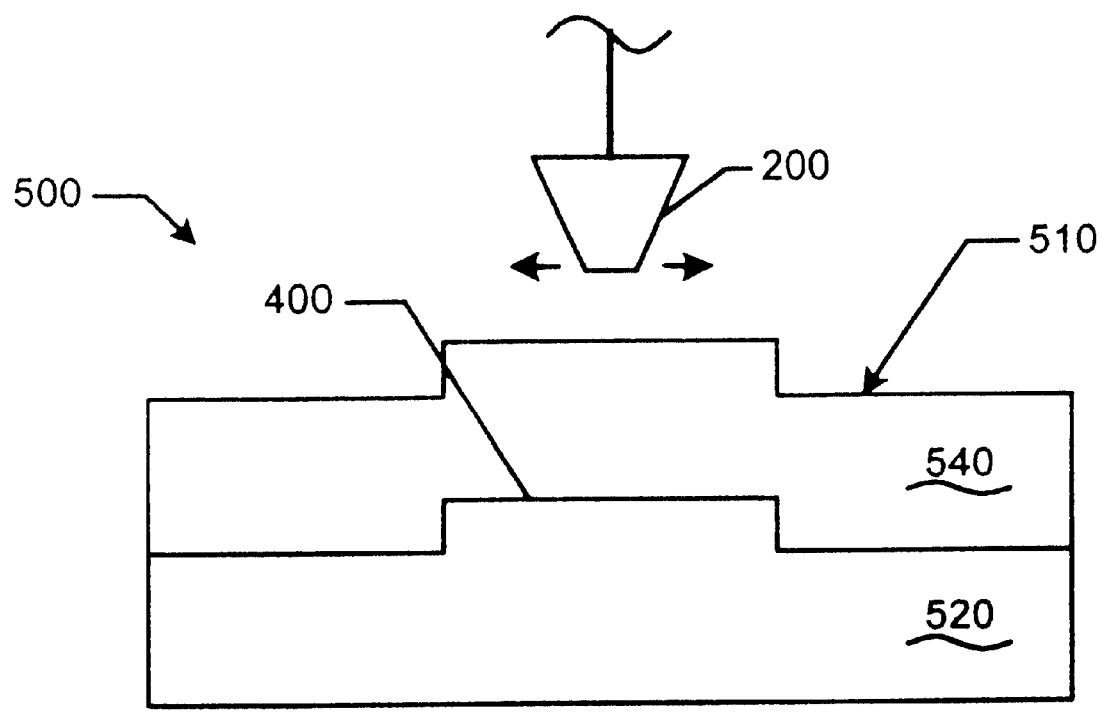

FIG. 7 is a schematic cross section an embodiment of medium 500. In this embodiment, there is no magnetic material on substrate 520. Instead, a thick hard coat layer or stack 540 has been deposited on substrate 520 (and thus over feature 400) so that the topography of thick hard coat layer or stack 540 substantially conforms to that of substrate 520. The overall thickness of thick hard coat layer or stack 540 may be in the range of 5 to 500 nanometer.

In this and all other embodiments, suitable materials for thick hard coat layer or stack 540 include diamond-like carbon (DLC), hydrogenated carbon, nitrogenated carbon (C:N), and the like. Thick hard coat layer or stack 540 may in turn comprise several layers, each having different properties but all functioning together to provide the functionality of thick hard coat layer or stack 540 as a whole. For example, a layer in contact with the substrate (or closest to it, if at least one intervening layer is present) may be a prime layer chosen for improved adhesion to the substrate; this would be desirable in the case of a polymeric substrate. The prime layer may also provide electrical conductivity to medium 500 to reduce electrostatic effects from interfering with the performance of system 100. The next layer could be a relatively hard intermediate layer, which bonds strongly to the underlying prime layer and provides a strong bonding surface for the subsequent deposition of other layers. The intermediate layer also improves mechanical support for subsequent layers. A final hard coat layer could be optimized for superior performance in its interaction with the transducer, e.g., parameters such as hardness, ability to retain lubrication (if used), coefficient of friction, and chemical stability in high temperature environments would be considered.

Figure 8:
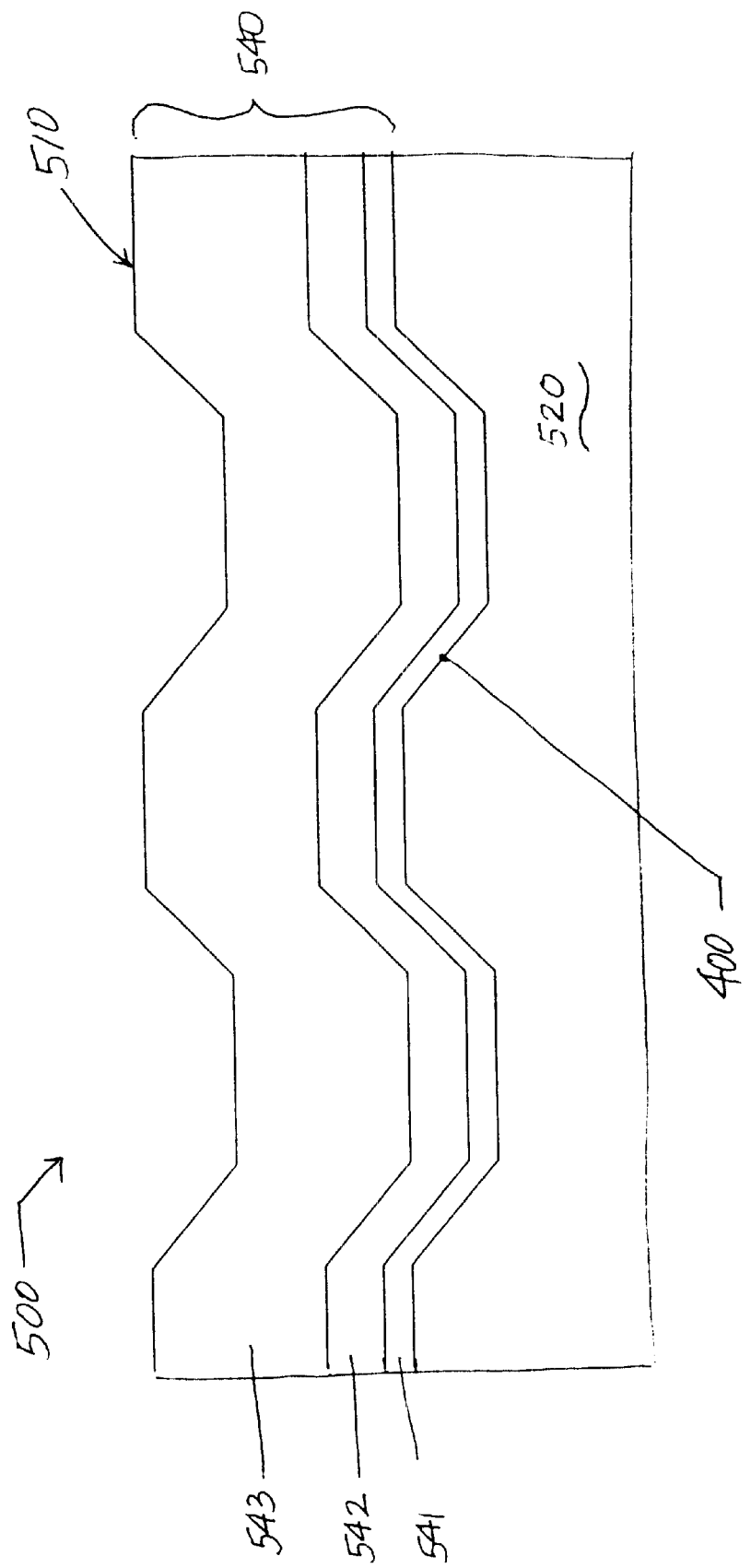

As illustrated in FIG. 8, one possible design for an embodiment of recording medium 500 would include an injection molded polymeric disk substrate 520 having topographical features 400 in the shapes of bumps in the range of 5 to 50 nanometer in height and about 0.1 to 0.2 micron in smallest lateral dimension. A moderate to low pressure sputtering technique in a conventional magnetron thin film sputtering apparatus would coat a prime layer 541 of a suitable high-adhesion material (e.g. chromium or titanium) on the substrate 520. To provide electrical conductivity across the substrate, to thus help prevent electrostatic discharge between the recording medium and the transducer, the thickness of the prime layer may be in the range of 5 to 100 nanometers. Next, a hard intermediate layer 542 of Silicon Nitride ($SiN_x$) would be coated on the prime layer using a pulsed DC magnetron. This material would bond strongly to the prime layer and also provide a strong bonding surface for the subsequent deposition of carbon-nitride (C:N) or diamond-like carbon (DLC). $SiN_x$ would also provide strong mechanical support for the final hard coat layer. This $SiN_x$ layer may be in the range of 5 to 100 nanometer in thickness. The final hard coat layer 543 of C:N or DLC would be coated by magnetron sputtering or by ion beam deposition. The thickness of the final hard coat layer may be about 5 to 500 nanometer in thickness, with thicker layers providing improved durability despite relatively harsh environments.

Possible uses of the physical features of the invention include any (or any combination of): non-volatile servo information for positioning the magnetic head (or heads) along a track; automatic gain control (AGC) data; timing or location synchronization; encoding information for any purpose, such as error detection/correction codes, Gray codes, servo bursts, and the like; product identification data such as manufacturing information, authentication information, encryption codes or keys (public or private); customer identification in the case of custom products; "embedded applications" such as operating systems, application programs, and the like; watermarking and similar data related to the authenticity or uniqueness of any data, and patent and copyright notices.

In all embodiments of the invention, term "topographical features" should be understood in its broadest sense within the operating principles of the invention, and therefore the term is considered to include features such as bumps, pits, lands, valleys, rails, grooves, channels, ridges, and so on. Similarly, while a single topographical feature is illustrated and described, this is only for clarity and therefore the invention includes (or is equivalent to) embodiments in which more than one type or shape of topographical feature is present. Nor is the invention limited in any manner by the technique used to manufacture the topographical features and/or the substrate itself, and therefore embossing, etching, molding, ablating, stamping from a master, and the like are all equivalent for purposes of defining the invention. The term "substrate" should be understood to include both monolithic and compound (e.g. layered) objects. Similarly, a substrate may be either rigid or flexible.

It is also within the scope of the invention to detect any physical effect (or a change in the same) and convert it into an alternative value. Such conversions may be performed in analog or digital forms, in hardware and/or software, all without reducing the scope of the invention.

What is claimed is:

1. A data recording medium comprising:
   a substrate having topographical features readable with a slider-mourned non-magnetic transducer sensitive primarily to changes in local aerodynamic boundary conditions; and
   a hard coat layer or stack substantially conforming to the topographical features, wherein the hard coat layer or stack bar has a thickness of 5 to 700 nm.

2. The medium of claim 1, wherein the hard coat layer or stack includes one of diamond-like carbon, hydrogenated carbon, and nitrogenated carbon.

3. The medium of claim 2, in which the hard coat layer or stack has a thickness of 5 to 500 nm.

4. The medium of claim 1, in which the topographical features are above a surface of the substrate.

5. The medium of claim 1, in which the topographical features are below a surface of the substrate.

6. The medium of claim 1, wherein the hard layer or stack comprises a stack including:
   a prime layer to provide electrical conductivity and reduce electrostatic effects;
   an intermediate layer bonded to the prime layer; and
   a layer of carbon-nitride or diamond-like carbon bonded to the intermediate layer.

7. The medium of claim 6, wherein the prime layer includes chromium or titanium of a thickness in the range of 5 to 100 nm, the intermediate layer includes silicon nitride of a thickness in the range of 5 to 100 nn, and the layer of carbon-nitride or diamond-like carbon has a thickness in the range of 5 to 500 nn.

8. In combination, a data recording medium comprising a substrate having topographical features and a hard coat layer or stack substantially conforming to the topographical features, wherein the hard coat layer or stack has a thickness of 5 to 700 nm; and a slider-mounted non-magnetic transducer sensitive primarily to changes to local aerodynamic boundary conditions.

9. The combination of claim 8, wherein the hard coat layer or stack includes one of diamond-like carbon, hydrogenated carbon, and nitrogenated carbon.

10. The combination of claim 9, in which the hard coat layer or stack has a thickness of 5 to 500 nm.

11. The combination of claim 8, in which the topographical features are above a surface of the substrate.

12. The combination of claim 8, in which the topographical features are below a surface of the substrate.

13. The combination of claim 8, in which the changes in local aerodynamic boundary conditions affect temperature.

14. The combination of claim 8, in which the changes in local aerodynamic boundary conditions affect pressure.

15. A data playback system, comprising:
a recording medium comprising a substrate having topographical features, and a hard coat layer or stack substantially conforming to the topographical features, wherein the hard coat layer or stack has a thickness of 5 to 700 nm;
a slider-mounted non-magnetic transducer sensitive primarily to changes In local aerodynamic boundary conditions; and
an apparatus adapted to process signals produced by the transducer reading data from the topographical features.

16. The system of claim 15, in which the medium is removable from the system.

17. The system of claim 15, wherein the hard coat layer or stack includes one of diamond-like carbon, hydrogenated carbon, and nitrogenated carbon.

18. The system of claim 17, in which the bard coat layer or stack has a thickness of 5 to 500 nm.

19. The system of claim 15, in which the topographical features are above a surface of the substrate.

20. The system of claim 15, in which the topographical features are below a surface of the substrate.

21. The system of claim 15, in which the changes in local aerodynamic boundary conditions affect temperature.

22. The system of claim 15, in which the changes in local aerodynamic boundary conditions affect pressure.

23. A process of recording data, comprising:
purposefully creating in a medium topographical features readable with a slider-mounted non-magnetic transducer sensitive primarily to changes in local aerodynamic boundary condition; and
forming a hard coat layer or stack to substantially conform to the topographical features, wherein the hard coat layer or stack has a thickness of 5 to 700 nm.

24. The process of claim 23, wherein the hard coat layer or stack includes one of carbon-nitride and diamond-like carbon.

25. The process of claim 24, in which the hard coat layer or stack has a thickness of 5 to 500 nm.

26. The process of claim 23, in which the changes in local aerodynamic boundary conditions affect temperature.

27. The process of claim 23, in which the changes in local aerodynamic boundary conditions affect pressure.

* * * * *

UNITED STATES PATENT AND TRADEMARK OFFICE
CERTIFICATE OF CORRECTION

PATENT NO. : 6,628,598 B2  Page 1 of 1
APPLICATION NO. : 09/730242
DATED : September 30, 2003
INVENTOR(S) : Edwards et al.

It is certified that error appears in the above-identified patent and that said Letters Patent is hereby corrected as shown below:

Title page item (54) and Col. 1, line 1,
"PATTERNED MEDIA SYSTEM" should read --PATTERNED MEDIA INCLUDING A HARD COAT LAYER OR STACK SUBSTANTIALLY CONFORMING TO TOPOGRAPHICAL FEATURES--.

Column 8
Line 20, "slider-mourned" should read --slider-mounted--.
Line 25, "stack bar has" should read --stack has--.

Column 9
Line 18, "bard" should read --hard--.

Signed and Sealed this

Twelfth Day of August, 2008

JON W. DUDAS
*Director of the United States Patent and Trademark Office*